United States Patent
Kim et al.

(10) Patent No.: US 8,825,340 B2
(45) Date of Patent: Sep. 2, 2014

(54) VIBRATION CONTROL APPARATUS OF DRIVING SYSTEM FOR VEHICLE AND CONTROL METHOD THEREOF

(75) Inventors: Sang Joon Kim, Seoul (KR); Jae Sung Bang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 129 days.

(21) Appl. No.: 13/527,775

(22) Filed: Jun. 20, 2012

(65) Prior Publication Data

US 2013/0131950 A1  May 23, 2013

(30) Foreign Application Priority Data

Nov. 18, 2011 (KR) .................. 10-2011-0121235

(51) Int. Cl.
*G06F 19/00* (2011.01)
*B62D 33/06* (2006.01)

(52) U.S. Cl.
USPC .................................... 701/99; 180/89.15

(58) Field of Classification Search
USPC ............. 701/99, 84, 37, 104, 29.2, 101; 180/89.15
See application file for complete search history.

(56) References Cited

U.S. PATENT DOCUMENTS

2009/0093937 A1* 4/2009 Lupo et al. ............... 701/84

FOREIGN PATENT DOCUMENTS

| JP | 2007224886 A | | 9/2007 |
| JP | 2010-200587 | * | 9/2010 |
| JP | 2010200587 A | | 9/2010 |
| KR | 10-0974752 | | 2/2010 |
| KR | 10-2010-00103989 | | 9/2010 |

* cited by examiner

*Primary Examiner* — Muhammad Shafi
(74) *Attorney, Agent, or Firm* — Edwards Wildman Palmer LLP; Peter F. Corless

(57) ABSTRACT

Disclosed is a vibration control apparatus of a driving system for a vehicle. More specifically, a toque command generating portion receives a demand torque from a driver and generates a torque command for operating a motor. A torque control portion receives the torque command from the toque command generating portion, collects information on exterior disturbances, and controls an actual torque of the motor accordingly. Lastly, a damping portion extracts and filters a vibration element generated due to operation of the motor by control of the torque control portion and generates a target torque to eliminate vibrations from the motor.

11 Claims, 3 Drawing Sheets

(a)
motor speed (b)
extracting vibration element (c)
OFFSET

VIBRATION CONTROL APPARATUS OF DRIVING SYSTEM FOR VEHICLE AND CONTROL METHOD THEREOF

CROSS-REFERENCE TO RELATED APPLICATION

This application claims priority to and the benefit of Korean Patent Application No. 10-2011-0121235 filed in the Korean Intellectual Property Office on Nov. 18, 2011, the entire contents of which are incorporated herein by reference.

BACKGROUND OF THE INVENTION (a) Field of the Invention

The present invention relates to a vibration control apparatus of a driving system for a vehicle and a control method thereof. More particularly, the present invention relates to a vibration control apparatus of a driving system for a vehicle and a control method thereof using the speed of a motor.

(b) Description of the Related Art

Generally, a hybrid vehicle uses an engine and a motor as alternating or supplemental power sources for reducing emissions and improving fuel consumption efficiency. In addition, hybrid vehicles can be divided in to three distinct types: a power split type, a soft type and a transmission-mounted electric drive (TMED) type.

Hybrid vehicles using the TMED type include an engine, an ignition starting generator (ISG) connected with the engine by a pulley so as to increase speed of the engine when the engine is started, a clutch to engage and disengage power from the engine to the transmission and output shaft, and a drive motor directly connected with a transmission. Typically, a continuously variable transmission (CVT) or a multi-stage shifting transmission is used as the transmission of the hybrid vehicle. In particular, a multi-stage shifting transmission is generally installed in a TMED type hybrid vehicle.

When the supply of engine torque is required in the TMED type hybrid vehicle, impact and vibration can occur due to engagement of the clutch as engine torque is being applied. Thus, a multi-stage shifting transmission may be more disadvantageous than a CVT with regard to the level of smoothness felt during shifting.

Conventionally speaking, a typical automatic transmission includes a torque converter disposed between an engine and a transmission for absorbing shock related to power delivery and shifting. However, a TMED type hybrid vehicle utilizes a wet clutch instead of a torque converter to absorb the shock form the power delivery and thus can feel "clunky" to the user.

In addition, a transmission, a reduction gear and various gear elements disposed between a motor and a drive shaft of the hybrid vehicle have a backlash characteristic. However, in a hybrid vehicle vibration is generated when the direction of torque is switched due to the gear elements since the hybrid vehicle lacks damping elements such as a torsion damper to account for the backlash of the gear elements. Further, the vibration may induce deterioration in drivability of the vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vibration control apparatus of a driving system for a vehicle and a control method thereof having advantages of efficient reducing vibration of the vehicle.

A vibration control apparatus of a driving system for a vehicle according to an exemplary embodiment of the present invention may include: a control unit or controller that includes a toque command generating portion configured to receive a demand torque from a driver and to generate a torque command for operating a motor; a torque control portion configured to receive the torque command from the toque command generating portion, to collect information on exterior disturbances and to control an actual torque of the motor; and a damping portion configured to extract and filter a vibration element generated due to operation of the motor through controlling the torque control portion and generating a target torque to eliminate a vibration from the motor. The target torque generated from the damping portion is transmitted together with the information on the exterior disturbances to the torque control portion.

The damping portion may include: a vibration extracting portion configured to extract and filter the vibration element of the motor; and a vibration control portion configured to receive the vibration element filtered by the vibration extracting portion and to generate the target torque to eliminate vibrations from the motor.

The vibration extracting portion may include: a first vibration extracting portion configured to receive and filter information related to the speed of the motor to extract the vibration element generated by operation of the motor; and a second vibration extracting portion configured to standardize the vibration element extracted by the first vibration extracting portion with respect to a 0 base line. In some embodiments of the exemplary embodiment of the present invention, a low pass filter or a band pass filter may be used at each of the first vibration extracting portion and the second vibration extracting portion.

A vibration control method of a driving system for a vehicle controls a vibration control apparatus which has a toque command generating portion receiving a demand torque from a driver and generating a torque command of a motor, a torque control portion receiving the torque command and controlling a torque of the motor, and a damping portion absorbing vibration generated by speed of the motor.

The method may include: a) primarily extracting a vibration element generated by the speed of the motor; b) standardizing the vibration element with respect to a 0 base line; c) secondarily extracting of the standardized vibration element; and d) calculating a target torque according to the standardized vibration element for the vibration to become 0. A low pass filter or a band pass filter may be used in the primary extraction and/or the secondary extraction.

The damping portion may include a vibration extracting portion and a vibration control portion, and the vibration extracting portion may include a first vibration extracting portion for performing the primary extraction and a second vibration extracting portion for standardizing the vibration element. Additionally, the method may return to the step a) when the torque control portion controls the torque of the motor according to the target torque and information on exterior disturbances.

BRIEF DESCRIPTION OF THE DRAWINGS

It should be understood that the appended drawings are not necessarily to scale, presenting a somewhat simplified representation of various preferred features illustrative of the basic principles of the invention.

Figure 1:
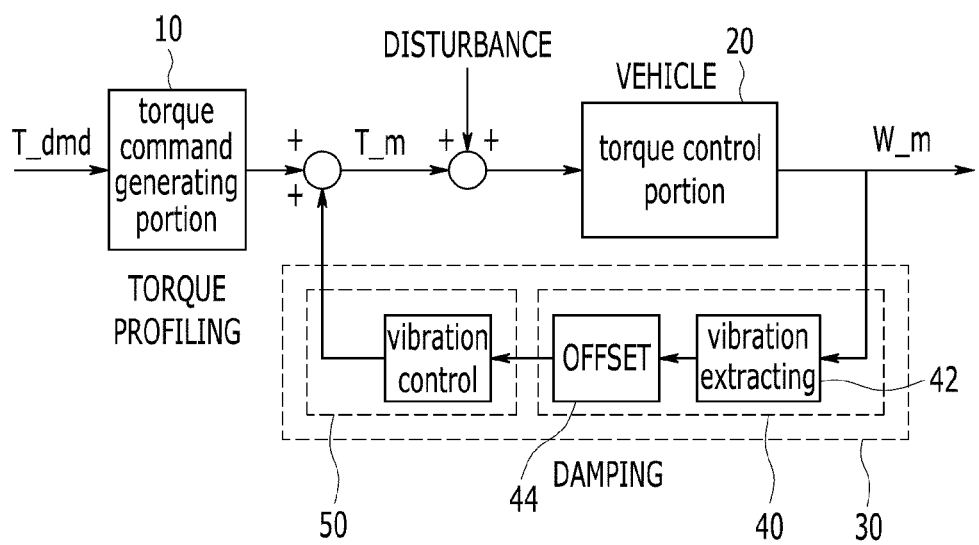
FIG. 1 is a schematic diagram of a vibration control apparatus of a driving system for a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DESCRIPTION OF SYMBOLS

10: toque command generating portion
20: torque control portion
30: damping portion
40: vibration extracting portion
42: first vibration extracting portion
44: second vibration extracting portion
50: vibration control portion

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

FIG. 1 is a schematic diagram of a vibration control apparatus of a driving system for a vehicle according to an exemplary embodiment of the present invention. As shown in FIG. 1, a vibration control apparatus of a driving system for a vehicle according to an exemplary embodiment of the present invention may include a toque command generating portion 10, a torque control portion 20 and a damping portion 30. In some embodiments the torque generating portion 10, the torque control portion 20 and the damping portion 30 may be embodied in a control unit, controller, centralize computer or any other device capable of performing the processes described for each portion below.

The toque command generating portion 10 illustratively receives a demand torque to a motor (not shown) from a driver and generates a torque command for operating the motor. The torque control portion 20 receives torque command and information related to exterior disturbances and controls an actual torque of the motor. In addition, the torque control portion 20 may receive the information related to exterior disturbances from sensors (not shown) mounted to the vehicle.

The damping portion 30 may be configured to extract and filter a vibration element generated due to the operation of the motor, and control reduction of vibrations accordingly. In addition, the damping portion 30 may be configured to include a vibration extracting portion 40 and a vibration control portion 50.

The vibration extracting portion 40 may include a first vibration extracting portion 42 and a second vibration extracting portion 44. In addition, the first vibration extracting portion 42 can be configured to receive information on speed of the motor and directly extract the vibration element generated due to the operation of the motor. Further, the second vibration extracting portion 44 may be configured to receive information related to the vibration element extracted by the first vibration extracting portion 42 and perform offset accordingly. Herein, the offset is a process that is configured to standardize the vibration element with respect to a 0 base line. That is, the vibration element of a normal state is subtracted from the extracted vibration element so that the vibration element converges to 0.

The vibration control portion 50 may receive a final vibration element having completed the standardization from the second vibration extracting portion 44 and control the reduction of the vibration accordingly. In other words, the vibration control portion 50 may receive feedback related to the vibration element generated based on the operation of the motor and generates a target torque to reduce the vibration(s) accordingly. Meanwhile, a calculation for reducing the vibration can be easily applied by a person of ordinary skill in the art. Therefore, a detailed description thereof will be omitted.

A control value to reduce the vibration is inputted as a target torque and is transmitted to the torque control portion 20 together with information related to exterior disturbances. Therefore, the process sequentially performed by the torque control portion 20 and the damping portion 30 may be repeatedly performed while the motor is operated.

Figure 2:
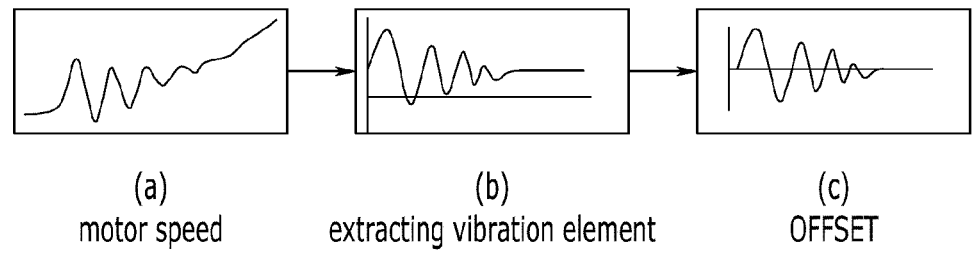
FIG. 2 is a block diagram showing a process for extracting vibration of a vibration extracting portion according to an exemplary embodiment of the present invention.

FIG. 2 is a block diagram illustrating a process for extracting vibration of a vibration extracting portion according to an exemplary embodiment of the present invention through graphical images. Graphical image (a) illustrates the current speed of the motor. In addition, process (b) illustrates a vibration element due to speed of the motor. Further, process shows final vibration output once the offset has been applied.

For example, the first vibration extracting portion 42 may extract vibration elements like those illustrated in graphical image (b) from the motor speed of graphical image (a). In addition, the second vibration extracting portion 44 may receive the vibration element of graphical (b) from the first vibration extracting portion 42 and perform offset to standardize the vibration element with respect to the 0 base line. Further, in the process performed by the first and second vibration extracting portions 42 and 44, a low pass filter or a band pass filter may be used to filter out the vibrations.

Herein, the low pass filter refers to a filter passing only a frequency that is lower than or equal to a predetermined frequency, and the band pass filter refers to a filter passing only a frequency within predetermined range. Meanwhile, the low pass filter and the band pass filter individually are understood by persons of ordinary skill in the art. Therefore, a detailed description thereof will be omitted.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
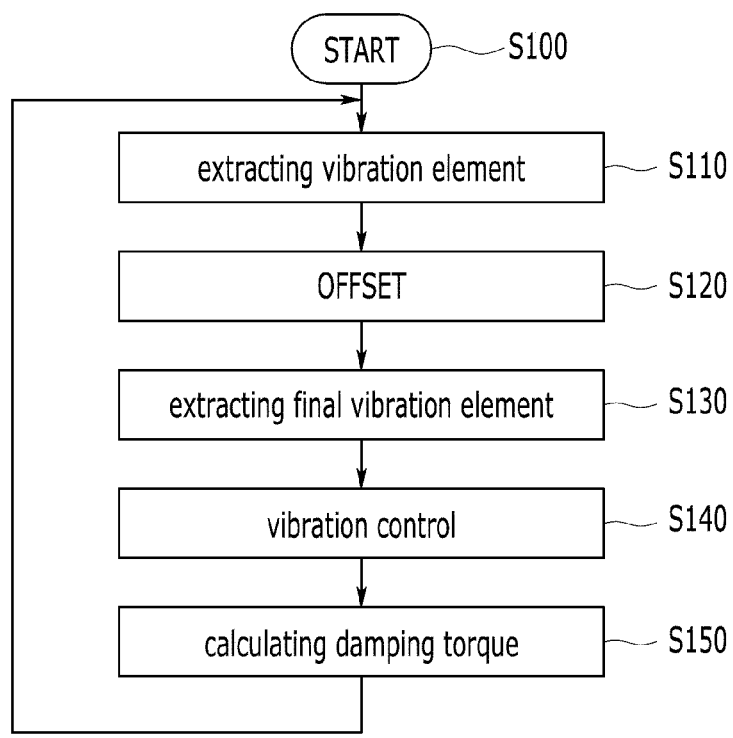
FIG. 3 is a flowchart of a vibration control method of a driving system for a vehicle according to an exemplary embodiment of the present invention.

FIG. 3 is a flowchart of a vibration control method of a driving system for a vehicle according to an exemplary embodiment of the present invention. As shown in FIG. 3, after the motor is operated at step S100, a vibration element of the motor is extracted by the first vibration extracting portion 42 at step S110.

If the vibration element is extracted, the second vibration extracting portion 44 receives the vibration element and performs offset to standardize the vibration element with respect to the 0 base line at step S120. That is, the vibration element of a normal state is subtracted from the extracted vibration element so that the vibration element converges to 0. In addition, when the offset is completed, the final vibration element is extracted at step S130.

The second vibration extracting portion 44 transmits the final vibration element to the vibration control portion 50. In addition, the vibration control portion 50 performs vibration control according to information related to the final vibration element such that vibration element of the motor becomes 0 at step S140.

A target torque of the motor is determined according to a control value obtained by the vibration control at step S150. In addition, the torque control portion 20 controls the motor according to information on the target torque and the exterior disturbances. The process is repeatedly performed from step S110 while the motor is being operated to continuously damping vibrations from the motor.

Advantageously, the exemplary embodiment of the present invention controls vibration is model independent (meaning it can be used in various types of vehicles) since the vibration frequency according to the motor speed is controlled to a preset range. In addition, reliability of vibration reduction can be enhanced as the vibration frequency of the motor is directly controlled. Therefore, drivability of a vehicle can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vibration control apparatus of a driving system for a vehicle comprising:
   a toque command generating portion configured to receive a demand torque from a driver and generate a torque command for operating a motor;
   a torque control portion configured to receive the torque command from the toque command generating portion, collect information related to exterior disturbances and control an actual torque of the motor; and
   a damping portion configured to extract and filter a vibration element generated due to the operation of the motor by control of the torque control portion and generate a target torque to eliminate vibrations from the motor,
   wherein the target torque generated from the damping portion is transmitted together with the information related to the exterior disturbances to the torque control portion,
   wherein the damping portion includes:
      a vibration extracting portion configured to extract and filter the vibration element of the motor; and
      a vibration control portion configured to receive the vibration element filtered by the vibration extracting portion and generate the target torque so as to eliminate the vibration of the motor,
   wherein the vibration extracting portion includes:
      a first vibration extracting portion configured to receive and filter information on speed of the motor to extract the vibration element generated by operation of the motor; and
      a second vibration extracting portion configured to standardize the vibration element extracted by the first vibration extracting portion with respect to a 0 base line.

2. The apparatus of claim 1, wherein a low pass filter is used at each of the first vibration extracting portion and the second vibration extracting portion.

3. The apparatus of claim 1, wherein a band pass filter is used at each of the first vibration extracting portion and the second vibration extracting portion.

4. A vibration control method of a driving system for a vehicle comprising:
   receiving, by a controller installed in the vehicle, a demand torque from a driver and generating a torque command of a motor accordingly;
   primarily extracting, by the controller, a vibration element generated based on a speed of the motor;
   standardizing, by the controller, the extracted vibration element with respect to a 0 base line;
   secondarily extracting the standardized vibration element by the controller; and
   calculating, by the controller, a target torque according to the standardized vibration element for the vibration to become 0.

5. The method of claim 4, wherein a low pass filter or a band pass filter is used in the primary extraction.

6. The method of claim 4, wherein a low pass filter or a band pass filter is used in the second extraction.

7. The method of claim 4, wherein the controller comprises a vibration extracting portion and a vibration control portion,
   wherein the vibration extracting portion comprises a first vibration extracting portion configured to perform the primary extraction and a second vibration extracting portion configured to standardize the vibration element.

8. The method of claim 4, wherein the method continuously repeats to continuously control vibrations from the motor.

9. A system for controlling vibrations from a motor in a vehicle, the system comprising:
 a controller including:
  a first portion configured to receive a demand torque from a driver and generate a torque command for operating the motor in the vehicle;
  a second portion configured to receive the torque command from the first portion, collect information related to exterior disturbances and control an actual torque of the motor; and
  a third portion configured to extract and filter a vibration element generated due to the operation of the motor by control of the second portion and generate a target torque to eliminate vibrations from the motor,
  wherein the target torque generated from the third portion is transmitted together with the information related to the exterior disturbances to the second portion of the controller,
  wherein the third portion includes:
   a fourth portion configured to extract and filter the vibration element of the motor; and
   a fifth portion configured to receive the vibration element filtered by the vibration extracting portion and generate the target torque so as to eliminate the vibration of the motor,
  wherein the fourth portion includes:
   a sixth portion receiving and filtering information on speed of the motor so as to extract the vibration element generated by operation of the motor; and
   a seventh portion standardizing the vibration element extracted by the first vibration extracting portion with respect to a 0 base line.

10. The system of claim 9, wherein a low pass filter or a band pass filter is used at each of the first vibration extracting portion and the second vibration extracting portion.

11. A non-transitory computer readable medium containing program instructions executed by a processor or controller, the computer readable medium comprising:
 program instructions that generate a torque command for operating the motor in the vehicle based on a received demand torque from a driver and;
 program instructions that collect information related to exterior disturbances and control an actual torque of the motor upon receiving the torque command; and
 program instructions that extract and filter a vibration element generated due to the operation of the motor and generate a target torque to eliminate vibrations from the motor,
 wherein the target torque is generated according to a standardized vibration element for the vibration to become 0.

* * * * *